UNITED STATES PATENT OFFICE.

ST. GEORGE T. C. BRYAN, OF BIRMINGHAM, ALABAMA.

PROCESS OF TREATING SLAG.

SPECIFICATION forming part of Letters Patent No. 429,225, dated June 3, 1890.

Application filed April 24, 1889. Serial No. 308,450. (No specimens.)

*To all whom it may concern:*

Be it known that I, ST. GEORGE T. C. BRYAN, of Birmingham, in the county of Jefferson and State of Alabama, have invented a certain new and useful Process of Treating Slag, of which the following is a specification.

The object of my invention is to prepare slag, which is now chiefly a waste product and troublesome to get rid of, for constructive purposes, such as building-blocks, paving-blocks, &c. To this end I use only such slags as come from smelting-furnaces in which the percentage of metal, if present, is not great enough to warrant saving.

Accordingly my invention consists in a peculiar treatment of such slags, which is in part a mechanical process of annealing them and in part a chemical combination between them and alumina, producing a homogeneous mass and changing its qualities—that is, increasing the quantity or per cent. of alumina, which is a chemical base. This produces a more basic silicate of alumina. Such slags are never uniform in composition and temperature, as they come from different furnaces, and are often admixed with hurtful gases and fumes and both solid and liquid foreign matter. The presence of these foreign substances and the want of homogeneous composition and uniform temperature unfit them for general use. Because of the impossibility of satisfactorily annealing these slags and compositions made from them, which demands a temperature substantially uniform throughout the mass (that can only be maintained in a body which is homogenous during a change from a molten to a solid state) and demands the absence of foreign matter during the processes of annealing, I proceed substantially as follows:

To practice my method of treating slag—first, deliver it in a molten state as it flows from the furnace into a suitable receptacle. Second. Mix with it a small amount of alumina or other combinations of aluminium, the amount to be determined by the use to which the material is to be applied and the nature of the slag itself. The alumina to be added may be made anhydrous and be heated and added to the slag while it is flowing from the furnace into the vessel. From ten to twenty-five per cent. of alumina will generally be found to be sufficient for all masses of slag in addition to that already contained in them. This variation of quantity of alumina to be added is necessary on account of the varying compositions of slags produced from ordinary smelting-furnaces, which are generally composed of lime, silica, and alumina in combination. Third. I then cause the molten mass to be agitated by stirring it or by revolving the vessel containing the molten composition, so as to give it a rotary motion. By this means I thoroughly intermingle and fuse the alumina with the slag, and also, when desired, eliminate gases and fumes and gas and fume producing matter. The molten and unmolten foreign matter is collected through centrifugal force and gravity and then removed. Afterward by continued stirring and agitation, which is an act of annealing when done within given limits, a homogeneous molten mass of uniform temperature is produced. The stirring or agitation may be continued with advantage, after the satisfactory fusion and combination has taken place, during part of the process of cooling, and before or after the composition is discharged into molds. Molten and unmolten foreign matter lighter than the slag rises to the top and is dipped off. Heavy liquid or solid matter sinks to the bottom and is drawn off through any usual trap-hole or allowed to remain there, and is afterward removed. Gaseous foreign matter will rise and pass off in the air.

The composition of slag and alumina that I produce, on account of the admixture and uniform combination between the substances constituting the slag and the alumina added, is a substantially new material from the result of such homogeneous fusion and possesses great strength and toughness, and is far less brittle than slag or slag compositions heretofore made.

I claim—

The herein-described process of treating slag by intimately intermingling and fusing with it alumina or combinations of aluminium, then rotating it in a suitable vessel when in a molten state, so as to separate impurities from it through the action of gravity and centrifugal force, removing the impurities, and after the removal of such impurities stirring the slag, so as to make the fused mass practically homogeneous and of uniform temperature and quality, substantially as set forth.

In testimony of all which I have hereunto subscribed my name.

ST. GEORGE T. C. BRYAN.

Witnesses:
MARCUS S. HOPKINS,
S. A. TERRY.